United States Patent
Labelle

(10) Patent No.: US 7,103,237 B2
(45) Date of Patent: Sep. 5, 2006

(54) METHODS AND DEVICES FOR INDEXING AND SEARCHING FOR DIGITAL IMAGES TAKING INTO ACCOUNT THE SPATIAL DISTRIBUTION OF THE CONTENT OF THE IMAGES

(75) Inventor: Lilian Labelle, Dinan (FR)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

(21) Appl. No.: 09/835,392

(22) Filed: Apr. 17, 2001

(65) Prior Publication Data

US 2002/0018592 A1 Feb. 14, 2002

(51) Int. Cl.
*G06K 9/54* (2006.01)
*G06K 9/46* (2006.01)

(52) U.S. Cl. .................................. 382/305; 382/190

(58) Field of Classification Search ................ 707/100; 382/165, 164, 190, 224, 240, 170, 305
See application file for complete search history.

(56) References Cited

OTHER PUBLICATIONS

Shih Fu Chang and John R. Smith. "Extracting Multi-Dimensional Signal Features for Content-Based Visual Query". May 1995 SPIE Symposium on Visual Communications adn Signal Processing. pp. 1-12.*
Kai-Chieh Liang and Jay Kuo. "WaveGuide: A Joint Wavelet-Based Image Representation and Description System". Nov. 1999. IEEE Transactions on Image Processing vol. 8, No. 11. pp. 1619-1629.*
Andre Folkers. Ph D. Thesis "Pictorial Query Specification and Processing ". Jan. 2000. pp. 1-178.*
John. R. Smith. Ph D. Thesis "Integrated Spatial and Feature Image Systems: Retieval, Analysis and Compression". 1997. pp. 1-75.*
J.R. Smith and S. Chang, "Transform Features for Texture Classification and Discrimination in Large Image Databases". IEEE ICIP-94, 1994.*
G. Van de Wouwer,"Color Texture Classification by Wavelet Energy Correlation Signatures". ICIAP (1): 327-334, 1997.*
T. Chang and J. Kuo,"Texture Analysis and Classification with Tree-Structured Wavelet Transfom". IEEE Transactions on Image Processing, vol. 2, No. 4, Oct. 1993.*
B. Moghaddam et al., "Defining Image Content with Multiple Regions-of-Interest", IEEE Workshop on Content-Based Access o Image and Video Libraries, Jun. 1999.*

(Continued)

*Primary Examiner*—Vikkram Bali
*Assistant Examiner*—Colin LaRose
(74) *Attorney, Agent, or Firm*—Fitzpatrick, Cella, Harper & Scinto

(57) ABSTRACT

According to the invention, a method of indexing a digital image comprises the following steps: generating a first information item (H(Im)) characteristic of the visual content of the image (Im) to be indexed; generating a second information item (W(Im)) characteristic of the spatial distribution of the visual content of the image (Im) in its image plane; and associating, with the image (Im), an index (IDX(Im)) composed of the first information item (H(Im)) and the second information item (W(Im)).

More particularly, the step of generating the first information item (H(Im)) has the following substeps: dividing the image plane of the image (Im) according to a partitioning comprising a predefined number N of blocks ($B_i$); extracting, from each of the blocks ($B_i$), a data item of a first type ($h_i^{Im}$) representing at least one characteristic of the visual content of the block under consideration; and generating the first information item (H(Im)) as being a vector having N components, each of which is one of the data items of the first type ($h_i^{Im}$).

18 Claims, 8 Drawing Sheets

OTHER PUBLICATIONS

D. Dupplaw et al., "Spatial Colour Matching for Content Based Image Retrieval and Navigation", Challenge of Image Retrieval, 1999.*

J. Malki et al., "Region Queries without Segmentation for Image Retrieval by Content", International Conference on Visual Information Systems (VISUAL'99), Lecture Notes in Computer Science vol. 1614, pp. 115-122., Jun. 1999.*

A. Folkers et al., "Processing Pictorial Queries with Multiple Instances using Isomorphic Subgraphs", Proceedings of the 15th International Conference on Pattern Recognition, vol. 4, No. 3-7, Sep. 2000.*

J.R. Ullmann, "An Algorithm for Subgraph Isomorphism", JACM vol. 23, Issue 1, Jan. 1976.*

J. Lee and B. Dickinson, "Multiresolution Video Indexing For Subband Coded Video Databases", Proceedings of IS&T/SPIE, Conference on Storage and Retrieval for Image and Video Databases, 1994.*

J. Huang et al., "Image Indexing Using Color Correlograms", Proceedings of the IEEE Computer Society Conference on Computer Vision and Pattern Recognition, 1997.*

J.R. Smith and S. Chang, "Tools and Techniques for Color Image Retrieva"I, IS&T/SPIE Proceedings vol. 2670, Storage & Retrieval for Image and Video Databases IV, 1996.*

J.R. Smith and S. Chang," Local Color and Texture Extraction and Spatial Query", Proceedings of the International Conferenc on Image Processing, 1996.*

J.R. Smith and S. Chang, "VisualSEEk: A Fully Auotmated Content-Based Image Query System", ACM Multimedia '96, 1996.*

J.R. Bach et al., "The Virage Image Search Engine: An Open Framework for Image Management", SPIE vol. 2670, Mar. 1996.*

Flickner et al., "Query by Image and Video Content: The QBIC System", IEEE Computer Magazine, Sep. 1995.*

C. Nastar et al., "SurfImage: A Flexible Content-Based Image Retrieval System". ACM Multimedia '98, 1998.*

S. Sclaroff et al., "ImageRover: A Content-Based Image Browser for the World-Wide Web", Proceedings of the IEEE Workshop on Content-Based Access of Image and Video Libraries, Jun. 1997.*

R. Milanese et al., "Correspondence Analysis and Hierarchical Indexing for Content-Based Image Retrieval", Proceedings of th Information Conference on Image Processing, 1996.*

R. Manmatha et al., "On Computing Local and Global Similarity in Images", Technical Report MM-25, Center for Intelligent Information Retrieval, Computer Science Dept., University of Massachusetts, Amherst, Massachusetts, 1998.*

A. Jain et al., "Image Retrieval Using Color and Shape", Pattern Recognition 29 (8), pp. 1233-1244, 1996.*

A, Del Bimbo et al., "Using Weighted Spatial Relationships in Retrieval by Visual Contents", Proceedings of the IEEE Worksho on Content—Based Access of Image and Video Libraries, 1998.*

R. Veltkamp et al., "Content-Based Image Retrieval Systems: A Survey", Oct. 2002.*

Ko et al. "Image retrieval using flexible image subblocks". Proceedings of the 2000 ACM symposium on Applied computing—vol. 2, Mar. 2000, pp. 574-578.*

Stricker et al. "Similarity of Color Images", SPIE: Storage Retrieval and Video Database III, vol. 2420, Feb. 1995, pp. 381-392.*

Celentano, A., et al., "*Feature Integration and Relevance Feedback Analysis in Image Similarity Evaluation*," Journal of Electronic Imaging, U.S. SPIE + IS&T, vol. 7, No. 12 (Apr. 1, 1998), pp. 308-317, XP000750386 ISSN: 1017-9909.

Yamomoto, H., et al., "*Content-Based Similarity Retrieval of Images Based on Spatial Color Distributions*"Proceedings of the International Conference on Imag Analysis and Proceedings, (Jul. 27, 1999), pp. 951-956, XP002137676.

Institute of Electrical and Electronics Engineers: "*An Image Database System With fast Image Indexing Capability Based on Color Histograms*", Proceedings of the Region 10 Annual International Conference (TENCON), New York, U.S., IEEE, vol. Conf. 9 (Jul. 27, 1999), pp. 407-411, XP000529510, ISBN: 0-7803-1863-3.

Williams, R., "*The Goblin Quadtree*", Computer Journal, GB, Oxford University Press, Surrey, vol. 31, No. 4 (Aug. 1, 1988), pp. 358-363, XP000743648, ISSN: 0010-4620.

Lee, J., et al., "*Multiresolution Video Indexing For Subband Video Databases*," Dept. of Electrical Engineering, Princeton University, Princeton, N.J. 08544, Proc. of SPIE, vol. 2185 (Feb. 1994), pp. 162-170.

Swain, M. J., et al., "*Color Indexing*," International Journal of Computer Vision, 7:1 (1991), pp. 11-32.

Sm ith, J. R., et al., "*Quad-Tree Segmentation for Texture-Based Query*," Center for Telecommunications Research and Electrical Engineering Department, Columbia University, New York, N.Y. 10027, Proc. ACM 2$^{nd}$ Multimedia Conference, San Fran., CA (Oct. 1994), pp. 279-285.

Messmer, B. T., et al., "*Subgraph Isomorphism in Polynomial Time*," Thesis, University of Bern, Bern, Switzerland (Nov. 1995), pp. 1-33.

* cited by examiner

METHODS AND DEVICES FOR INDEXING AND SEARCHING FOR DIGITAL IMAGES TAKING INTO ACCOUNT THE SPATIAL DISTRIBUTION OF THE CONTENT OF THE IMAGES

TECHNICAL FIELD

The present invention concerns a method of indexing a digital image taking into account the spatial distribution of the visual content of the image.

The invention also concerns a method of searching for images from an example image, amongst a plurality of images stored in a database, the images being indexed according to the above-mentioned indexing method.

The invention also concerns a device capable of implementing the aforementioned image indexing and search methods.

BACKGROUND OF THE INVENTION

A conventional method of searching for digital images in a database containing images is based on a system of indexing images in the database.

The aim of an indexing system is to associate, with each image in the database, an information item characteristic of the content of the image referred to as the "image index". The set of these information items constitutes what is designated by the "database index". Typically, the content of an image is characterised by its colour distribution (histogram), its texture or its form.

A user interrogates a database of images through a query containing an information item characteristic of the image type sought. Conventionally, this query is constituted by an example image. The user chooses an image, from the database or external to it, whose content is similar to the image type sought. The content of the example image is then compared with the content of the database index according to a search strategy. Finally, the image in the database whose indexed information item has the greatest similarity to the content of the example image is extracted. Generally, a number of images are extracted from the database to be presented to the user, arranged according to the significance of their similarity with the query. The said user then makes a choice from amongst the images presented.

Conventionally, there are two approaches for defining the search strategy. It may be of the linear type or the hierarchical type.

The linear approach consists of considering the database as a single vector, each component of which is an image associated with an index. The strategy then consists of calculating the similarity between the index of the example image and that associated with each of the components of this vector. This strategy is easy to implement, which explains why it is often used. However, when the database contains a large number of images, of the order of several thousand, the calculation time for the search may be very long, which penalizes accordingly the time for responding to a query.

In order to reduce the above-mentioned calculation time, the hierarchical approach can be used. One known hierarchical search technique uses, for each image in the database, an index composed of two distinct parts which will be referred to here as "sub-indices". Amongst these two sub-indices, a first sub-index is of a not very discriminant type, while the second sub-index is of a more discriminant type.

The search process then takes place in two steps. During a first step referred to as a "filtering step", a "coarse" sorting of the images in the database is carried out using the first sub-indices. At the end of this step, a subset of images is selected. A second step, referred to as a "matching step" is then carried out, this time performed on the subset of images retained during the first step, during which the search is refined using the second sub-indices. At the end of this second step, only the images most resembling the example image are kept.

An example of a hierarchical search method is given in the article entitled "*Multiresolution video indexing for subband video database*", by J. Lee and B. W. Dickinson, Proc. of SPIE: Storage and retrieval for images and videos databases, vol. 2185, San Jose, Calif., February 1994. The search method taught in this article applies to images compressed by a subband decomposition technique. Each of the subbands of an image has an index associated with it. According to this search method, a start is made by comparing the indices associated with the so-called "low frequency" band of the images, then the search result obtained is refined by a comparison of the indices associated with the higher frequency bands.

Generally speaking, the known hierarchical search methods of the prior art use indices which characterise the overall content of the images. Thus, in the search method taught in the above-mentioned document, the indices characterise the overall content of the image according to a number of levels of resolution. However, in these search methods, the index of a given image never characterises the visual content of this image according to its spatial distribution over the whole image medium. The taking into account of the spatial distribution of the content by the image index would nevertheless make it possible to increase the accuracy of this index and therefore the accuracy of the search using such an index.

SUMMARY OF THE INVENTION

The aim of the present invention is to propose an indexing method by which the visual content of a given image is characterised notably by its spatial distribution over the whole image medium, and a search method using the said indexing method.

To that end, the present invention concerns, according to a first aspect, a method of indexing a digital image, characterised in that it comprises the following steps:
  generating a first information item (H(Im)) characteristic of the visual content of the said image (Im);
  generating a second information item (W(Im)) characteristic of the spatial distribution of the visual content of the image (Im) in its image plane;
  associating, with the said image (Im), an index (IDX(Im)) composed of the first information item (H(Im)) and the second information item (W(Im)).

Thus, an image index obtained by this method represents the visual content of the image through the first information item (H(Im)) included in it, and also represents the spatial distribution of the content in the image plane through the second information item (W(Im)) included in it. Consequently, this indexing method improves the representativeness of the index with respect to the image to which it relates, and increases the accuracy of an image search based on the use of such indices.

According to an advantageous characteristic of the invention, the step of generating the first information item (H(Im)) comprises the following substeps:

dividing the image plane of the said image (Im) according to a partitioning comprising a predefined number N of blocks ($B_i$);

extracting, from each of the said blocks ($B_i$), a data item of a first type ($h_i^{Im}$) representing at least one characteristic of the visual content of the block under consideration;

generating the said first information item (H(Im)) as being a vector having N components, each of which is one of the data items of the first type $$(h_i^{lm}).$$

Thus, the first information item (H(Im)), characteristic of the visual content of the image, represents the local content (inside the blocks) of the image, which also increases the accuracy of the index.

According to a first embodiment of the invention, the step of generating the second information item (W(Im)) comprises the following substeps:

calculating, for each of the blocks ($B_i$), a data item of a second type ($w_i^{Im}$) indicative of a degree of significance of the visual content of the block ($B_i$) under consideration with respect to the overall content of the image (Im);

generating the second information item (W(Im)) as being a vector having N components, each of which is one of the data items of the second type ($w_i^{Im}$).

By measuring the significance, for each of the blocks under consideration of the image, of the local content of the block with respect to the overall content of the image, there is finally obtained a second information item (W(Im)) which is indicative of the spatial distribution in the image plane of the first information item (H(Im)), characteristic of the visual content of the image. The second information item thus calculated makes it possible to make the image index effectively represent the spatial distribution of the visual content of the image in its image plane.

According to a particular aspect of the first embodiment, for each of the blocks ($B_i$), the data item of a second type ($w_i^{Im}$) indicative of a degree of significance of the visual content of the block ($B_i$) under consideration with respect to the overall content of the image (Im), is obtained by calculating the ratio between the Euclidean norm of the data item ($h_i^{Im}$) of the first type associated with the block ($B_i$) under consideration and the sum of the Euclidean norms of the data items of the first type associated with all the blocks of the image (Im).

This mode of calculating the data item of the second type ($w_i^{Im}$) associated with each of the blocks ($B_i$) of the image combines speed and efficiency.

According to a second embodiment of the invention, the image plane of the image (Im) is divided according to a quadtree decomposition process by means of which, at each phase of the decomposition, a block under consideration, referred to as the "parent block" ($B_p$), is decomposed into four blocks, referred to as "child blocks" ($B_f^p$), equal in size to a quarter the size of the parent block, and whose combination gives the parent block, the decomposition beginning with the overall image plane of the image (Im) and finishing when the predefined number N of blocks is reached. Moreover, at each phase of the decomposition, there is calculated, for each of the child blocks ($B_f^p$), a data item ($w_f^p$) of a second type, indicative of a degree of significance of the visual content of the child block under consideration with respect to the overall visual content of the parent block ($B_p$). The second information item (W(Im)) is then composed of the set of data items ($w_f^p$) of the second type stored according to a quadtree structure, each node of which is constituted by one of the data items of the second type.

Unlike the embodiment in which the image plane is divided according to a predefined grid of blocks, in this embodiment, the quadtree decomposition process, in which a number N of blocks to be reached is predefined, makes it possible to adapt the definition of the division grid to the spatial distribution of the content of the image.

According to a particular aspect of the second embodiment, at each phase of the quadtree decomposition of the image (Im), there is extracted, from the parent block ($B_p$) under consideration, a data item ($h_p$) of the first type representing at least one characteristic of its visual content and, for each child block ($B_f^p$) obtained by decomposition of the parent block ($B_p$), there is extracted a data item ($h_f^p$) of the first type representing at least one characteristic of the visual content of the child block under consideration. The data item ($w_f^p$) of the second type indicative of a degree of significance of the visual content of a child block ($B_f^p$) under consideration with respect to the overall visual content of the corresponding parent block ($B_p$) is obtained by calculating the ratio between the Euclidean norm of the data item ($h_f^p$) of the first type extracted for the child block ($B_f^p$) under consideration and the Euclidean norm of the data item ($h_p$) of the first type extracted from the corresponding parent block ($B_p$).

For each newly created child block, there is thus calculated a data item ($w_f^p$) of the second type indicative of a degree of significance of the visual content of the child block with respect to the overall visual content of the corresponding parent block. Therefore, the block subdivision process can be iterative.

According to a particular implementation characteristic of the invention, each of the data items of the first type, representing at least one characteristic of the visual content of a block under consideration of an image to be indexed, represents the distribution of colours in the block.

The present invention concerns, according to a second aspect, a method of searching for images, from an example image, in a database in which digital images are stored. In accordance with the invention, this image search method is characterised in that the example image and each of the images stored in the database are indexed according to an image indexing method as defined above.

With each of the images in the database being associated with an index as defined above, an image search according to such a method will consequently have an increased reliability/accuracy. Furthermore, with the indices being composed of two information items (H(Im) and W(Im)), a hierarchical type search method can be implemented.

In accordance with a preferred embodiment of the invention, the image search method has the following steps:

calculating a first similarity (Filter) between the example image (Q) and each of the images (D) amongst a predefined plurality of stored images, this first similarity being calculated from the second information items (W(Q); W(D)) associated respectively with the example image (Q) and the stored image (D) under consideration;

providing a first subset of images selected from amongst the predefined plurality of images according to their degree of first similarity (Filter) with the example image (Q);

calculating a second similarity (Match) between the example image (Q) and each of the images (Ds) amongst the first subset of selected images, this second similarity being calculated from the first information items (H(Q); H(Ds) associated respectively with the example image (Q) and the selected image (Ds) under consideration;

providing at least one image referred to as a result image, this result image or these result images being selected from amongst the first subset of selected images, according to its degree of second similarity (Match) with the example image.

Such a hierarchical search method makes it possible to obtain response times to a query which are small in comparison with those which would be obtained by using a linear search method based solely on the first information items (H(Im)). This difference is all the greater, the larger the number of images in the database.

According to a first embodiment of the search method, when the images are indexed in accordance with the above-mentioned first embodiment of the indexing method in accordance with the present invention, the step of calculating a first similarity (Filter) between the example image (Q) and each of the images (D) amongst a predefined plurality of stored images is implemented by calculating a distance between the second information item (W(Q)) associated with the example image and the second information item (W(D)) associated with the stored image under consideration (D).

The second information items (W(Im)) which are contained in the indices associated with the images in the database are by nature not very discriminant; however, a calculation of similarity, performed as described above, between two of these information items is very quick. Consequently, the calculation of a "first similarity" between the example image and each of the images in the database is quick overall.

According to a second embodiment of the search method, when the images are indexed in accordance with the above-mentioned second embodiment of the indexing method in accordance with the present invention, the step of calculating an aforementioned first similarity (Filter) is implemented by an isomorphism detection method applied to the quadtrees representing the second information items (W(Q); W(D)) associated respectively with the example image (Q) and the stored image (D) under consideration.

The use of an isomorphism detection method allows a quick comparison of the structure of two graphs. Knowing that the information concerning the spatial distribution of the content of an image is determined by a graph structure, two images are considered to be similar (first similarity) if the graph structures associated with their respective information items are close to one another.

According to a particular characteristic of the search method according to the invention, the step of calculating a second similarity (Match) between the example image (Q) and each of the images (Ds) amongst the first subset of selected images is implemented by calculating a distance between the first information item (H(Q)) associated with the example image and the first information item (H(D)) associated with the stored image under consideration (D).

This second similarity makes it possible to compare the content of two images according to the first information item (H(Im)) associated with each of them. The measurement of this similarity is expensive in calculation time but makes it possible to obtain accurate responses to a given search query.

More particularly, the step of calculating the second similarity (Match) is implemented by calculating the sum of the distances between each of the components ($h_i^Q$) of the first information item (H(Q)) associated with the example image (Q) and the corresponding component ($h_i^{Ds}$) of the first information item (H(Ds)) associated with the stored image (Ds) under consideration.

According to another aspect, the present invention concerns a digital data processing device, characterised in that it comprises means adapted to implement an image indexing method and/or an image search method as defined previously.

The present invention also concerns a computer comprising such a digital data processing device.

The invention also relates to a computer program having one or more instruction sequences capable of implementing the image indexing method and/or the image search method according to the invention when the program is loaded and executed in a computer.

The invention also relates to an information medium, such as a diskette or a compact disk (CD), characterised in that it contains such a computer program.

The advantages of this device, this computer, this computer program and this information medium are identical to those of the methods as briefly explained above.

BRIEF DESCRIPTION OF THE DRAWINGS

Other features and advantages of the invention will also emerge in the description below, given with reference to the accompanying drawings in which.

DETAILED DESCRIPTION OF THE INVENTION

Figure 1:
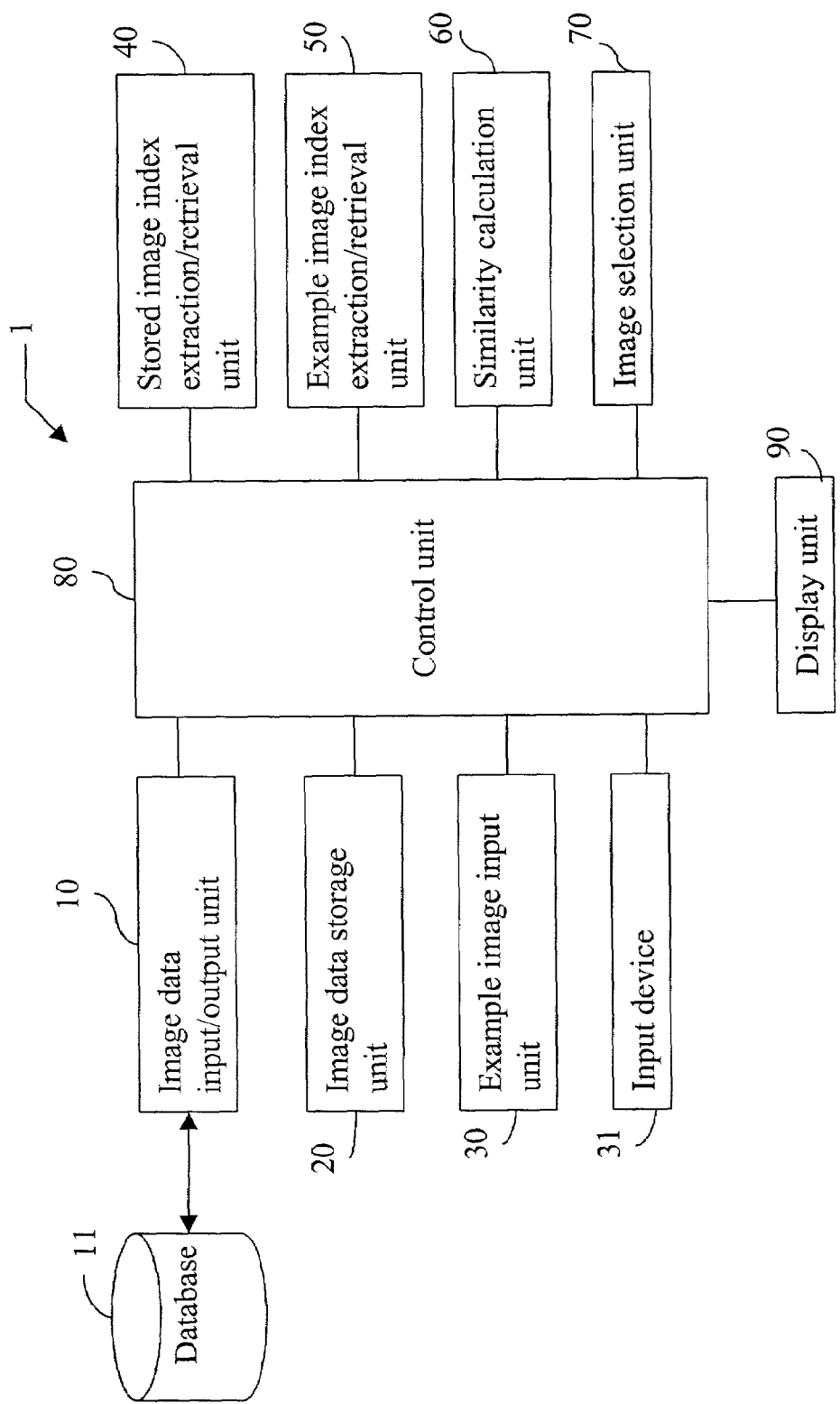
FIG. 1 is a block diagram illustrating the general architecture of an image search device in which the invention can be implemented.

With reference to FIG. 1, there will now be described the general architecture of an image search device in which the present invention can be implemented.

As depicted in FIG. 1, this image search device has a database 11 containing digital images stored in compressed or uncompressed form.

An image data input/output unit 10 allows input into the database 11 of new images to be stored and retrieval of stored images and/or the data indexed (indices) to stored images.

An example image input unit 30 is associated with an input device 31 in order to allow a user to input an example image to serve as a reference for the search. Typically, the input device 31 has a pointing device such as a mouse, and a keyboard.

An image data storage unit 20 is intended to store temporarily the data retrieved from the database 11 or the data associated with the example image obtained by the units 30 and 31.

A unit 40 has the function of retrieving the data indexed to the images stored in the database or generating these data for the new images which are to be stored in the database.

Similarly, a unit 50 is responsible for generating or retrieving the index data associated with the example image.

The index associated with each stored image is composed of two sub-indices, a first, not very discriminant sub-index and a second, more discriminant sub-index.

A similarity calculation unit 60 is responsible for evaluating the similarity of the example image with the images in the database.

An image selection unit 70 is responsible for sorting the images in the database according to their similarity with the example image and selecting one or more images as the result of the search.

The search method being of the hierarchical type, calculation of the similarity is performed in two steps as mentioned above. A start is made with a filtering step, followed by a "matching" step.

A display unit 90, comprising typically a screen, makes it possible to display windows for dialogue with the user as well as the result of an image search, represented for example in the form of "image thumbnails".

Finally, a control unit 80 controls and manages the overall operation of the image search device.

It should be noted that the various units which have just been described are implemented by the assembly of hardware and software elements.

Figure 2:
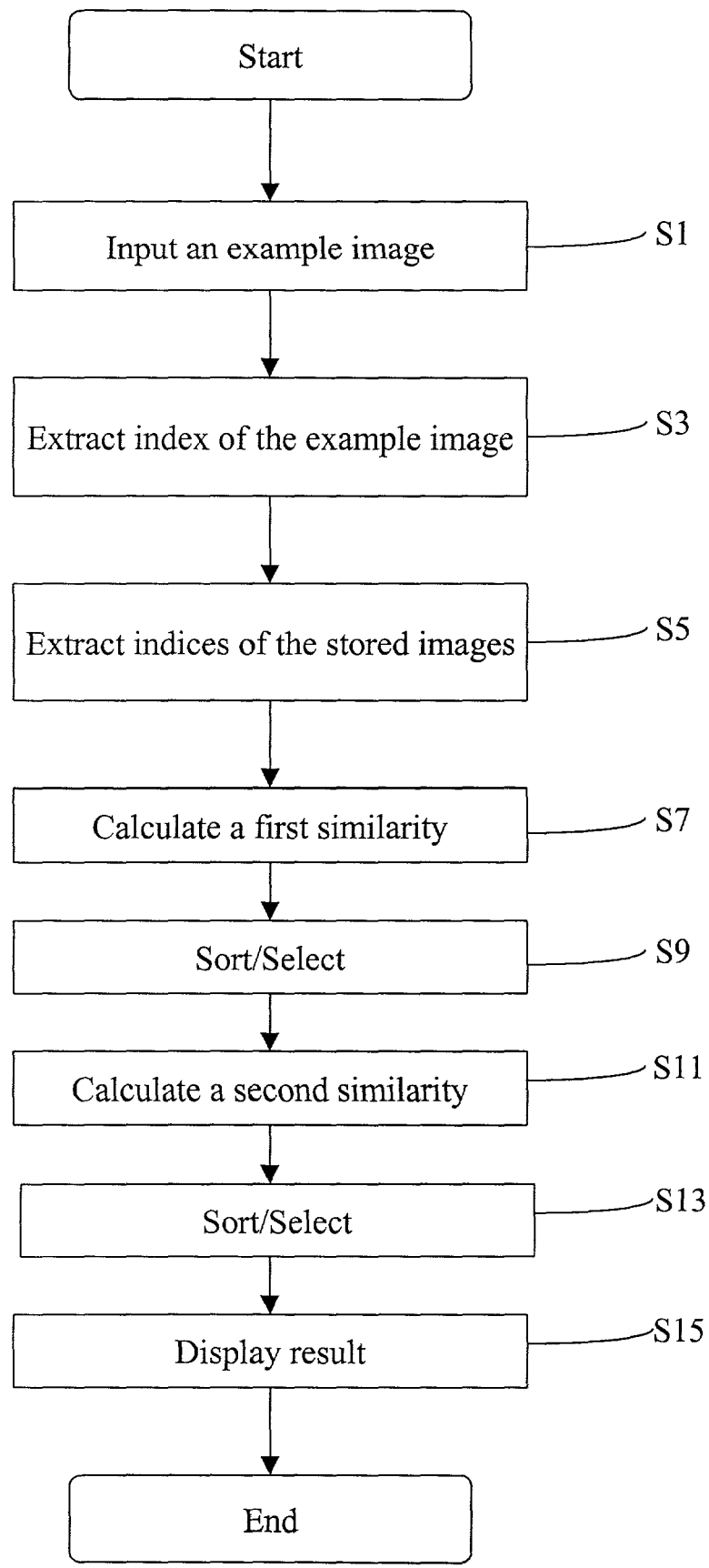
FIG. 2 depicts a flow diagram illustrating the sequence of steps of a hierarchical image search method implemented in the device of FIG. 1.

There will now be described, in connection with FIG. 2, a hierarchical image search method implemented in the device of FIG. 1.

The image search method starts with the step S1 at which a human user uses the example image input unit 30 associated with the input device 31, in order to define an example image which will serve as a reference for the image search in the database.

The user has the choice for defining the example image, between designating an image from the database or providing an image external to the database.

In order to be able to choose an image from the database as the example image, the user has the capability of requesting the display unit 90 to display, on the screen, "thumbnails" corresponding to the images in the database. The user can then select, by means of, for example, a mouse, the thumbnail whose content seems to him to be characteristic of that of the image or images for which he is searching. In a variant, the user can also use the keyboard to input the reference of the stored image he is choosing as the example image. Finally, if the user chooses to provide an example image external to the database, he can for example provide, to the unit 30, the access path to this image, which will be accessible via a data acquisition peripheral such as a diskette or compact disk (CDROM) drive integrated with the input device 31.

Returning to FIG. 2, once an example image has been input by the user (step S1), at the step S3, the example image index extraction unit 50 retrieves or generates the index of the example image.

Similarly, at the following step S5, the stored image index extraction unit 40 extracts the index associated with each of the images stored in the database.

The indices associated with the example image and with the stored images are temporarily saved in the image data storage unit 20.

At the step S7, the similarity calculation unit 60 retrieves the indices of the stored images and the index of the example image, previously stored in the unit 20, and performs a calculation of a first similarity between the example image and each of the stored images whose index has been extracted from the database. This "first similarity" is calculated on the basis of the first sub-indices (not very discriminant) associated with the example image and with the stored images.

At the step S9 which follows, the image selection unit 70 carries out the sorting and a selection of the stored images which were compared with the example image, according to their degree of first similarity with the said example image. For example, only the stored images whose calculated degree of similarity is above a predefined threshold will be kept. Amongst these, only a predefined number of images (for example 50) will be retained as having the highest degree of first similarity with the example image.

The steps S7 and S9 which have just been described constitute the "filtering" phase of the hierarchical search process. At the end of this phase, a subset of images stored in the database has therefore been selected.

At the step S11 which follows, there is carried out the calculation of a second similarity performed on the basis of the second sub-indices (more discriminant) associated with the example image and with the stored images belonging to the subset of images obtained during the filtering phase.

At the step S13 which follows, the image selection unit 70 carries out the sorting and a selection of the images of the subset of images which were compared with the example image, according to their degree of second similarity with the said example image. For example, only the stored images whose calculated degree of similarity is above a predefined threshold will be kept. Amongst these, only a predefined number of images (for example 5) will be retained as having the highest degree of second similarity with the example image.

The steps S11 and S13 which have just been described constitute the "matching" phase of the hierarchical search process. At the end of this phase, a predetermined number of images in the database have been selected as being the result of the search.

This result is displayed by the display unit 90 on a screen. In practice, the display unit displays, on the screen, thumbnails associated with the selected images. On the screen, the thumbnails are typically arranged according to an increasing or decreasing order of similarity with the example image. The user can then choose one or more images he considers match his query.

Figure 3:
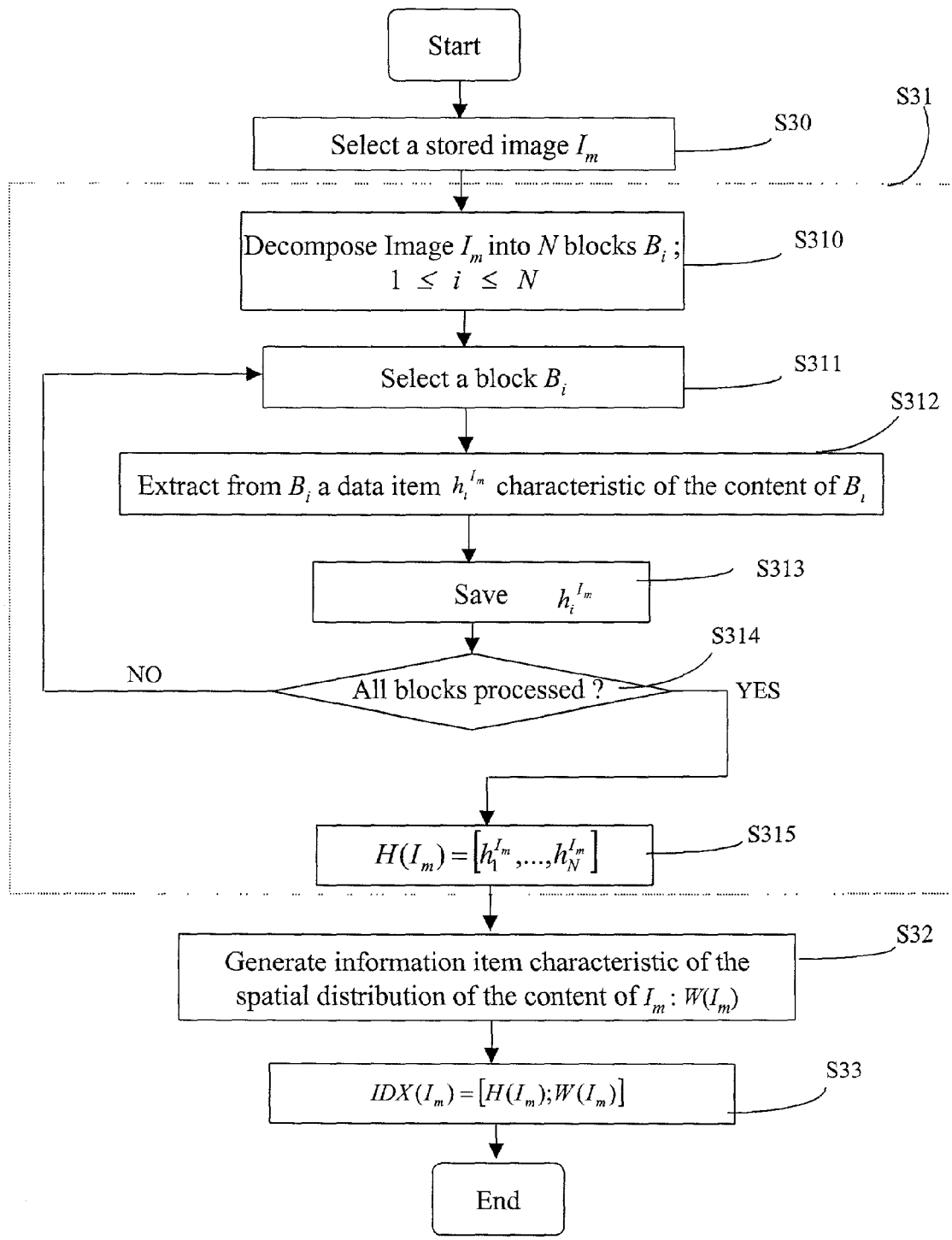
FIG. 3 depicts a flow diagram illustrating the general principle of an image indexing method according to the invention.

With reference to FIG. 3, there will now be described the general principle of an image indexing method in conformity with the invention. According to a preferred embodiment of the invention, this method is implemented in an image search device as described previously in connection with FIG. 1.

In accordance with the invention, this method of indexing a given image, denoted Im, essentially has three steps: a step S31 for generating a first information item, referred to as a "first sub-index" and denoted H(Im), characteristic of the visual content of the image; a step S32 for generating a second information item, referred to as a "second sub-index"

and denoted W(Im), characteristic of the spatial distribution in the image plane of the visual content of the image; and finally a step S33 for associating, with the image Im, an index, denoted IDX(Im), and composed of the aforementioned two information items.

The index IDX(Im) thus obtained is stored in the database 11 in relation with the storage representation of the image Im under consideration, that is to say, for example, with the corresponding binary stream in the case of storage in compressed form, or with a bitmap representation in the case of storage in uncompressed form.

As depicted in FIG. 3, the step S31 for generating the information item characteristic of the visual content of the image is composed of the sub-steps S310 to S315.

At the step S310, the image Im to be indexed is divided into an integer number N of blocks denoted $B_i$ (with i between 1 and N) forming a partitioning of the image Im.

It should be stated here that the term "partitioning" must be understood here in its mathematical sense which is stated below.

A partitioning of a set is a division of that set into non-empty parts, disjoint in pairs, and whose combination is equal to the set.

The process according to which the image is divided will be described later in connection with FIGS. 4 and 5.

During the following two steps, a start is made by selecting (S311) a block $B_i$ and then there is extracted (S312), from this block, a data item, denoted $h_i^{Im}$, characteristic of the visual content of the block.

At the following step S313, the extracted data item $h_i^{Im}$ is saved temporarily in the image data storage unit 20.

The step S314 which follows is a test step in which it is determined whether or not all the blocks resulting from the division of the image Im have been processed. If not, a return is made to the step S311 in order to select another block and the process starts again.

If yes, this means that, for each block $B_i$, a data item $h_i^{Im}$ has been extracted and saved. In this case, the next step will be the step S315, in which there is generated the information item (H(Im)) characteristic of the visual content of the image Im (that is to say the first sub-index) as being the vector with N components (N: number of blocks), each of which is one of the data items $h_i^{Im}$ calculated during the step S312. H(Im) can therefore be expressed as follows:

$$H(Im) = [h_1^{Im}, h_2^{Im}, \ldots, h_N^{Im}]$$

According to a preferred embodiment of the invention, each of the data items $h_i^{Im}$ characteristic of the visual content of a block under consideration of the image to be indexed (Im) represents the distribution of colours in the block.

In practice, each of the data items $h_i^{Im}$ is a colour histogram calculated for the block $B_i$ selected (S311).

The method used within the context of the present invention for calculating a colour histogram from an image is known in the prior art. To obtain further details on image indexing based on colours, reference can be made for example to the article by M. J. Swain and D. H. Ballard, entitled "Color Indexing", International Journal of Computer Vision, 7:1, 1991.

Figure 4:
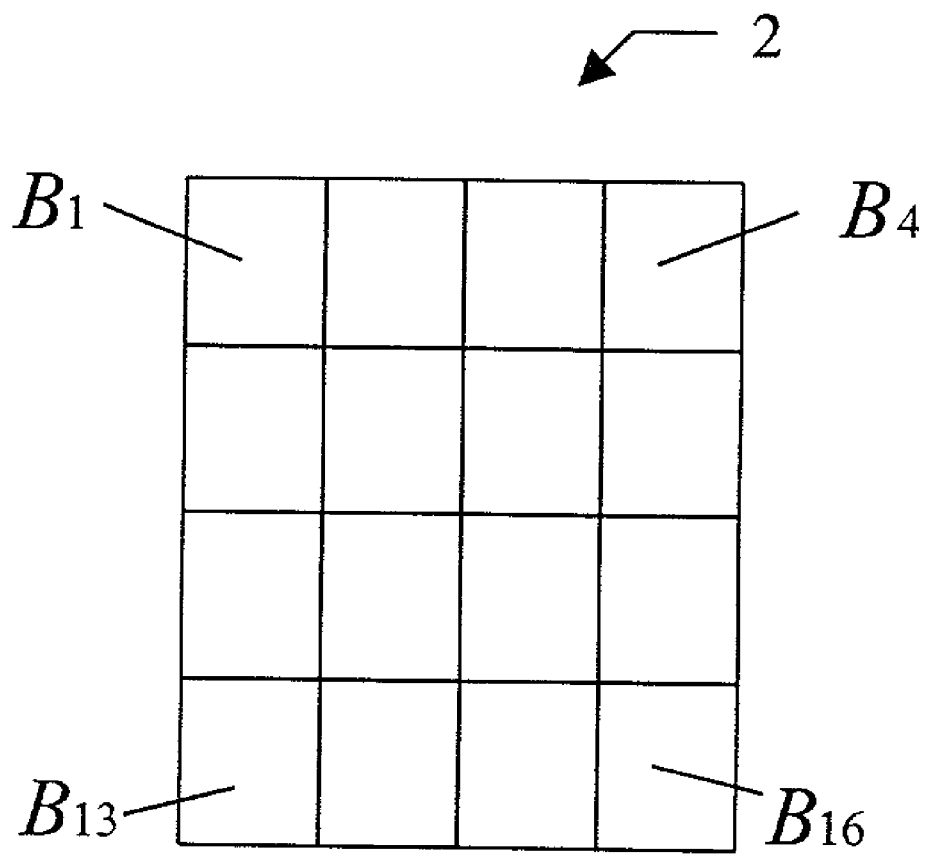
FIG. 4 illustrates an example of dividing an image according to a first embodiment of the invention.

With reference to FIG. 4, there will now be described an example of dividing an image according to a first embodiment of the invention.

In the division example illustrated in FIG. 4, the image Im (2) to be processed is divided according to a rectangular grid into 16 blocks (N=16), $B_1$ to $B_{16}$, with the same surface area.

Still according to the first embodiment of the invention, there will now be detailed the step (cf. FIG. 3, S32) for generating a second information item, referred to as the "second sub-index" and denoted W(Im), characteristic of the spatial distribution in the image plane of the visual content of the image Im to be indexed.

In accordance with the invention, in this embodiment, the step for generating the second sub-index W(Im) has the following sub-steps.

During a first sub-step, there is calculated, for each of the blocks ($B_i$) of the image, a data item, denoted $w_i^{Im}$, indicating a degree of significance of the visual content of the block $B_i$ under consideration with respect to the overall content of the image Im.

During a second sub-step, there is generated the second sub-index W(Im) as being the vector with N components (N: number of blocks), each component of which is one of the data items $w_i^{Im}$ calculated during the aforementioned first sub-step. W(Im) can therefore be expressed as follows:

$$W(Im) = [w_1^{Im}, w_2^{Im}, \ldots, w_N^{Im}]$$

Thus, this second sub-index is effectively characteristic of the spatial distribution of the content of the image Im in its image plane.

In conformity with a preferred embodiment of the invention, for each of the blocks $B_i$ of the image to be indexed, the data item $w_i^{Im}$ is obtained which is indicative of a degree of significance of the visual content of the block $B_i$ under consideration with respect to the overall content of the image Im, by applying the following formula:

$$w_i^{Im} = \frac{\|h_i^{Im}\|}{\sum_{i=1}^{N} \|h_i^{Im}\|} \tag{1}$$

in which $h_i^{Im}$ is the data item characteristic of the visual content of the block under consideration, extracted during generation of the first sub-index H(Im) of the image (cf. FIG. 3, S312). As mentioned previously, in practice, each of the data items $h_i^{Im}$ is a colour histogram calculated for the block $B_i$ under consideration.

Thus, each of the data items $w_i^{Im}$ is obtained by calculating the ratio between the Euclidean norm of the data item $h_i^{Im}$ characteristic of the visual content of the block under consideration and the sum of the Euclidean norms of these data items $h_i^{IM}$ associated with all the blocks of the image Im.

Figure 5:
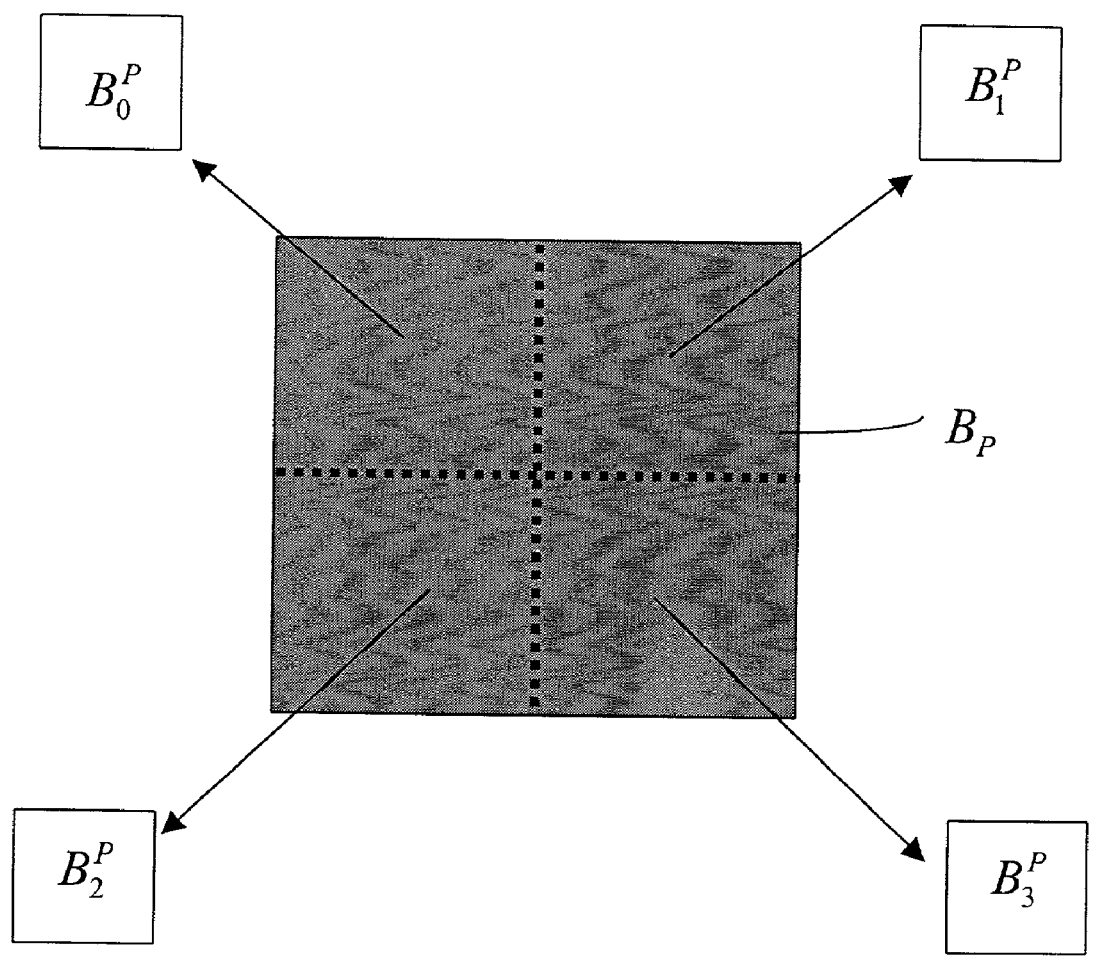
FIG. 5 illustrates an example of dividing an image according to a second embodiment of the invention.

With reference to FIG. 5, there will now be described an example of dividing an image according to a second embodiment of the invention.

According to this second embodiment, the image plane of the image (Im) is divided according to a quadtree decomposition process.

At each phase of the decomposition, a block under consideration, referred to as a "parent block" and denoted $B_p$, is decomposed into four blocks, referred to as "child blocks" and denoted $B_f^p$, equal in size to a quarter the size of the parent block, and whose combination gives the parent block.

The decomposition starts with the overall image plane of the image Im and finishes when a predefined number N of blocks is reached.

For example, if the predefined number of blocks is 16, the decomposition will be performed in two phases only.

As depicted in FIG. 5, during a phase under consideration, a parent block $B_p$ is decomposed into four child blocks: $B_0^P$, $B_1^P$, $B_2^P$ and $B_3^P$.

In accordance with the invention, at each phase of the quadtree decomposition of the image, there is calculated, for each of the child blocks $B_f^p$, a data item $w_f^p$ indicative of the degree of significance of the visual content of the child block under consideration with respect to the overall visual content of the corresponding parent block $B_p$.

The set of these data items $w_f^p$ calculated during each of the phases of the decomposition is then stored according to a quadtree structure, each node of which is constituted by one of these data items.

There is then generated the second sub-index W(Im) as being composed of the set of data items $w_f^p$ stored according to the quadtree structure.

There will now be detailed, in conformity with a preferred embodiment of the invention, the method according to which there is calculated a data item $w_f^p$ indicative of the degree of significance of the visual content of a child block with respect to the overall visual content of the corresponding parent block $B_p$.

At each phase of the quadtree decomposition of the image Im to be indexed, there is extracted, from the parent block $B_p$ under consideration, a data item, denoted $h_p$, representing at least one characteristic of its visual content and, for each child block $B_f^p$ obtained by decomposition of the parent block $B_p$ under consideration, there is extracted a data item, denoted $h_f^p$, representing at least one characteristic of the visual content of the child block under consideration.

There is then obtained the data item $w_f^p$ indicative of the degree of significance of the visual content of a child block $B_f^p$ under consideration with respect to the overall visual content of the corresponding parent block $B_p$, by applying the following formula:

$$w_f^p = \frac{\|h_f^p\|}{\|h_p\|} \quad (2)$$

Thus, a data item $w_f^p$ calculated for a child block under consideration $B_f^p$ is obtained by calculating the ratio between the Euclidean norm of the data item $h_f^p$ extracted from this child block $B_f^p$ and the Euclidean norm of the data item $h^p$ extracted from the corresponding parent block $B_p$.

According to a preferred embodiment of the invention, each of the data items $h_f^p$, $h_p$, characteristic respectively of the visual content of a child block under consideration $B_f^p$ of the image Im and of the visual content of the parent block $B_p$ from which this child block originated, represents the distribution of colours in the block.

In practice, each of the data items $h_f^p$, $h^p$ is a colour histogram extracted from the corresponding block.

Still in this embodiment of the invention, in which an image to be indexed Im is decomposed according to a quadtree, the first sub-index H(Im), that is to say the information item characteristic of the visual content of the image (Im), is constituted by the vector composed of the data items $h_f^p$ obtained during the last phase of decomposition of the image, that is to say, the data items $h_f^p$ extracted for the N child blocks obtained during this last phase.

Figure 6A:
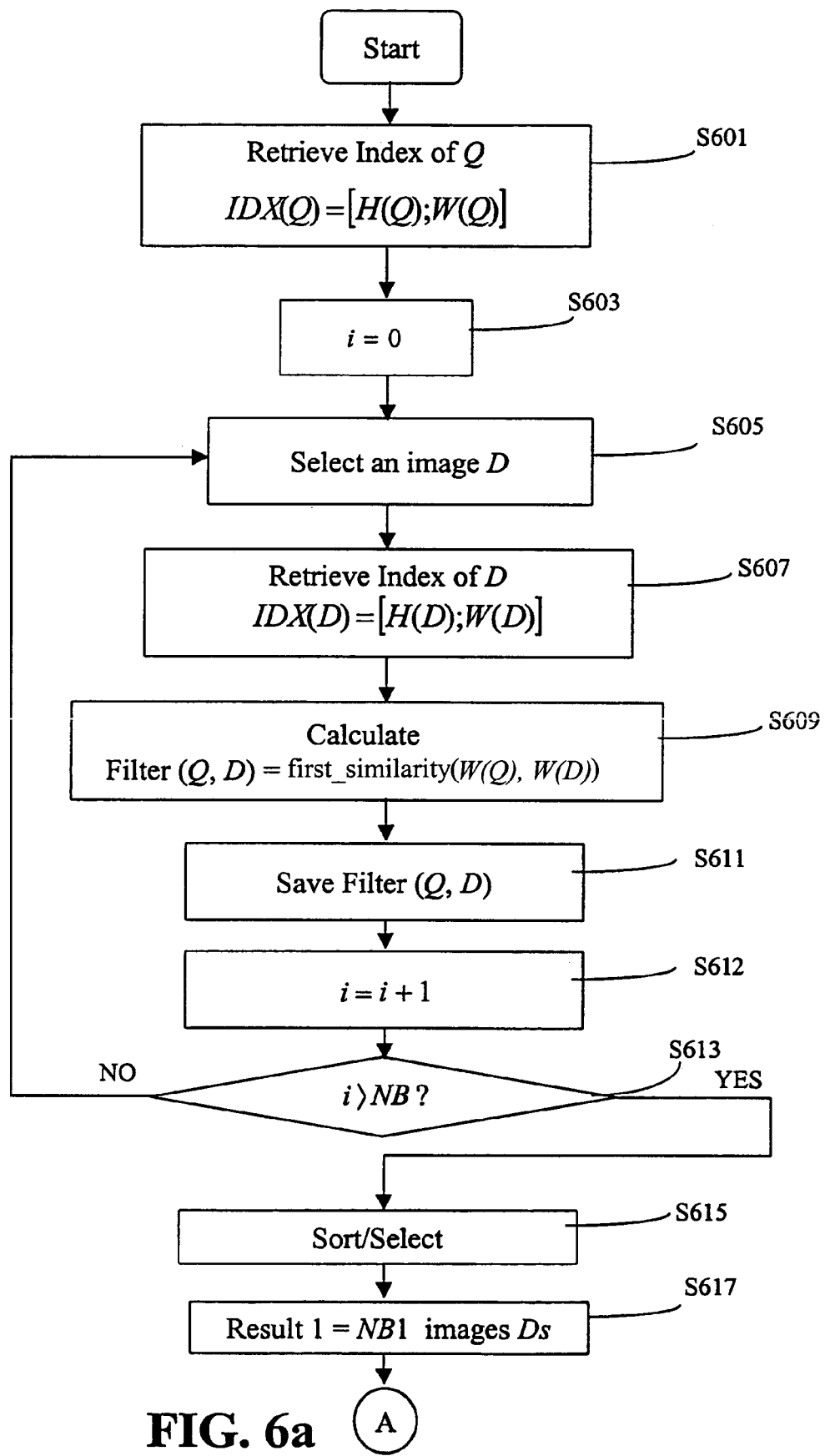
FIG. 6, composed of FIGS. 6a and 6b, illustrates an image search method according to the invention comprising a first, so-called "filtering" phase (FIG. 6a), and a second, so-called "matching" phase (FIG. 6b)
Figure 6A:
Figure 6B:
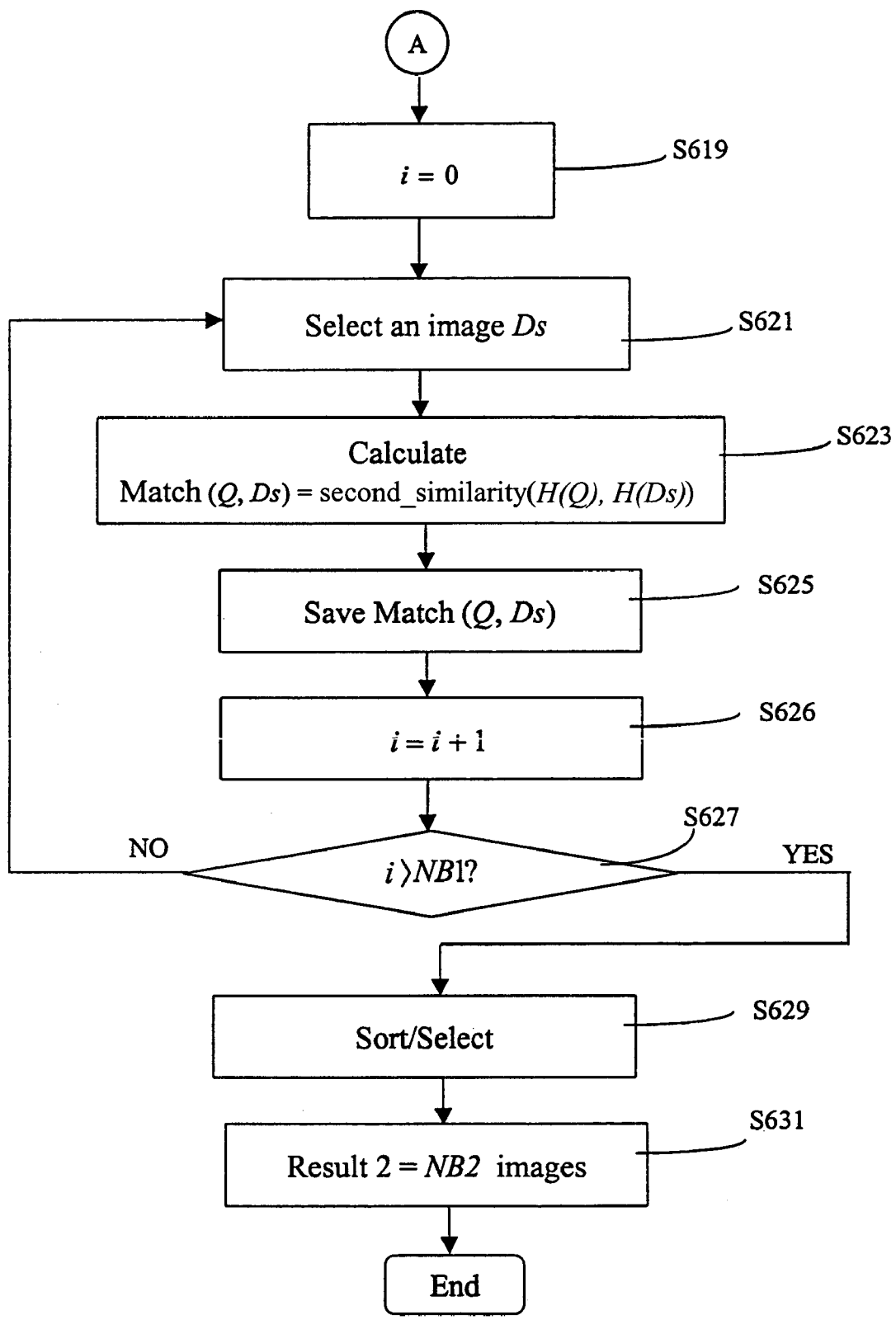

With reference to FIG. 6, composed of FIGS. 6a and 6b, there will now be described a hierarchical search method based on an indexing technique in conformity with the present invention.

There will first be described the first so-called "filtering" phase in connection with FIG. 6a, and there will next be described, in connection with FIG. 6b, the so-called "matching" phase.

In FIG. 6a, the search method according to the present invention starts at the step S601 in which the index of the example image Q, denoted IDX(Q), is retrieved. The index of the example image, like the index of each of the images stored in the database, is composed of the first sub-index H(Q) characteristic of the visual content of the image, and the second sub-index W(Q) characteristic of the spatial distribution of the visual content of the image in its image plane.

At the following step, a counter i is initialized to zero. This counter will be used to count the number of images processed in the database.

At the step S605 which follows, an image, denoted D, is selected from the database, for the purpose of being compared with the example image. To that end, there is retrieved, at the step S607, the index, denoted IDX(D), associated with this image.

It should be noted here that, although in a preferred embodiment of the invention all the images stored in the database are compared with the example image, also, as a variant, a number or a subset of stored images with which the search will be concerned can be predefined. In the following, the number of stored images with which the search is concerned is denoted "NB".

At the step S609, there is calculated a first similarity, denoted Filter(Q,D), between the example image Q and the image under consideration D. This first similarity is calculated from the sub-indices W(Q) and W(D) associated respectively with the example image and with the stored image under consideration.

In the embodiment of the invention described in relation to FIG. 4, this gives:

$$W(Q) = [w_1^Q, w_2^Q, \ldots, w_N^Q]$$

and $$W(D) = [w_1^D, w_2^D, \ldots, w_N^D]$$

where each of the data items $w_i^Q$ and $w_i^D$ is indicative of a degree of significance of the visual content of the block under consideration of the example image or of the stored image under consideration with respect to the overall content of the image (Q or D).

In this embodiment, the calculation of the first similarity Filter(Q,D) is implemented by determining the Euclidean distance between the sub-index W(Q) associated with the example image, and the corresponding sub-index W(D) associated with the stored image under consideration.

In the embodiment of the invention described in relation to FIG. 5, in which any image to be indexed is decomposed according to a quadtree structure, each sub-index, W(Q), W(D), is composed of the set of data items denoted $w_f^p$ and stored according to the quadtree structure (cf. above, description in connection with FIG. 5).

In this embodiment, the calculation of the first similarity, Filter(Q,D), is implemented by an isomorphism detection method applied to the quadtrees representing the sub-indices W(Q) and W(D) associated respectively with the example image Q and the stored image D under consideration.

To obtain further information concerning graph isomorphism detection methods, reference can be made for example to the work by B. T. Messmer, entitled "*Subgraph isomorphism in polynomial time*", thesis, University of Bern, November 1995.

Returning to FIG. 6a, once the first similarity Filter(Q,D) has been calculated (S609), the result of this calculation is saved temporarily in memory (unit 20, FIG. 1) at the step S611.

The following steps S612 and S613 are a test in which the counter i is first incremented (step S612) and then its value is compared with the number NB of stored images (step S613) with which the search is concerned.

If the value of the counter i is strictly greater than the number NB, this means that a first similarity Filter(Q,D) has been calculated for all the NB stored images. In this case, the next step will be the following step S615.

Conversely, if the value of the counter i is less than or equal to the number NB, this means that not all the stored images under consideration for the search have been processed. In this case, the next step will be the step E605 again in order to select another stored image D, and the process starts again as described previously (S605 to S611).

At the step S615, all the similarity values Filter(Q,D) stored for the NB stored images are retrieved, and then these values are sorted. A selection is then made, according to the similarity values obtained, of a predefined number, denoted "NB1", (for example equal to 50), of images amongst the NB stored images, as being the most similar to the example image.

Finally, at the step S617, the indices of the NB1 selected images are saved.

Thus, at the end of the filtering phase of the search method, there has been selected, from amongst the images in the database, a subset composed of a number NB1 of stored images. In the following description, any image amongst the NB1 stored images resulting from the filtering is designated by "image Ds".

Once the filtering phase has been carried out, the next phase is the "matching" phase of the search process which starts with the step E619 of FIG. 6b.

The step S619 is an initialization step in which the counter i is reset to zero. The counter i will be used to count the images Ds processed during this phase.

At the following step S621, an image Ds is selected (more precisely, its index is retrieved).

At the step S623, there is calculated a second similarity, denoted Match(Q,Ds), between the example image Q and the stored image Ds under consideration. This second similarity is calculated from the sub-indices H(Q) and H(Ds) associated respectively with the example image and the stored image under consideration, and expresses a distance between the two sub-indices H(Q) and H(Ds).

As described previously in connection with FIG. 3 (step S31), each of the sub-indices H(Q) and H(Ds) is a vector with N components where N is the number of blocks resulting from the division of the images. Each of these components is characteristic of the visual content of a corresponding block. This gives:

$$H(Q) = [h_1^Q, h_2^Q, \ldots, h_N^Q]$$

and $$H(Ds) = [h_1^{Ds}, h_2^{Ds}, \ldots, h_N^{Ds}]$$

According to a preferred embodiment of the invention, this second similarity Match(Q,Ds) is obtained by calculating the sum of the distances between each of the components $h_i^Q$ of the vector H(Q) associated with the example image and the corresponding component $h_i^{Ds}$ of the vector H(Ds) associated with the stored image Ds under consideration.

This can be expressed by the following formula:

$$\text{Match}(Q, Ds) = \sum_{i=1}^{N} d(h_i^Q, h_i^{Ds}) \tag{3}$$

According to a preferred embodiment in which the components $h_i^Q$, $h_i^{Ds}$ are colour histograms associated with the corresponding blocks of the images Q and Ds, each of the distances $d(h_i^Q, h_i^{Ds})$ is obtained by calculating the intersection between these histograms ($h_i^Q$ and $h_i^{Ds}$).

It should be noted that the intersection between histograms is known in the prior art. To obtain further details on the intersection between histograms, reference can be made, for example, to the article by M. J. Swain and D. H. Ballard, entitled "*Color Indexing*", International Journal of Computer Vision, 7:1, 1991.

Returning to FIG. 6b, once the calculation of the second similarity Match(Q,Ds) has been performed (S623), the result of this calculation is saved temporarily in memory (unit 20, FIG. 1) at the step S625.

The following steps S626 and S627 are a test in which the counter i is first incremented (step S626) and then its value is compared with the number NB1 of stored images (step S627) selected during the filtering phase (FIG. 6a).

If the value of the counter i is strictly greater than the number NB1, this means that a second similarity Match(Q, Ds) has been calculated for all the NB1 stored images selected. In this case, the next step is the following step S629.

Conversely, if the value of the counter i is less than or equal to the number NB1, this means that not all the stored images selected during the filtering phase have been processed. In this case, the next step is the step E621 again in order to select another stored image Ds, and the processes starts again as described previously (S621 to S627).

At the step S629, all the similarity values Match(Q,Ds) stored for the NB1 stored images are retrieved, and then these values are sorted.

Next a selection is made, according to the similarity values obtained, of a predefined number, denoted "NB2", (for example equal to 10) of images amongst the NB1 stored images selected during the filtering phase, as being the most similar to the example image.

Finally, at the step S631, the indices of the NB2 images selected at the end of the matching phase are saved.

These NB2 images constitute the final result of the search. There can then be displayed, on the screen, thumbnails corresponding to these images, so that the user can choose the one he considers matches his query best.

Figure 7:
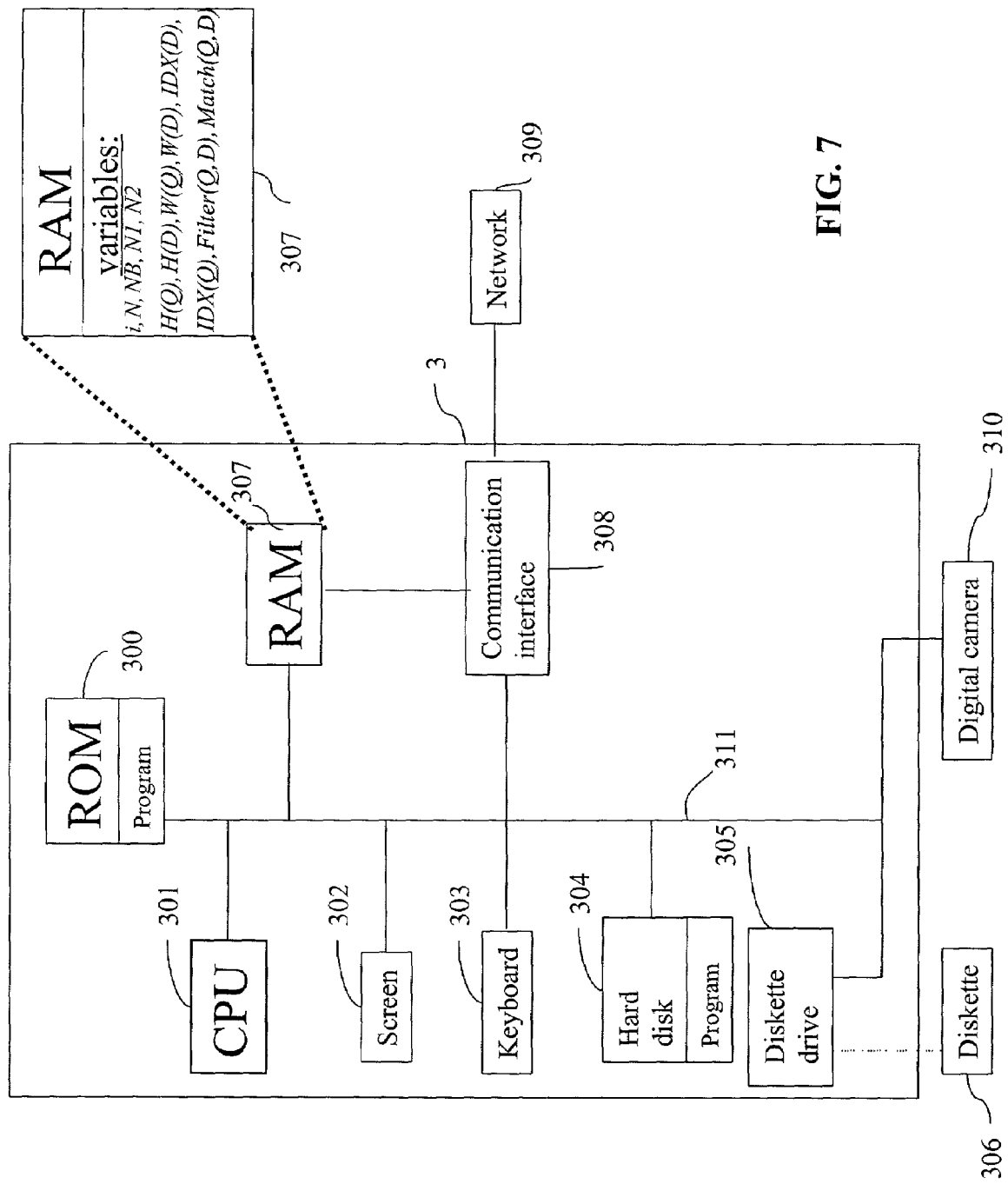
FIG. 7 depicts schematically a computer adapted to implement the image indexing and/or search methods in accordance with the present invention.

With reference now to FIG. 7, there will be described a computer adapted to implement the image indexing and/or search methods in accordance with the present invention and described above in connection with FIGS. 2 to 6.

It should be noted that the computer illustrated in FIG. 7 constitutes a particular embodiment of the general device described above in relation to FIG. 1.

In this embodiment, the image indexing and/or search methods according to the invention are implemented by a computer program. This program has one or more instruction sequences whose execution by the said computer allows the implementation of the steps of these methods.

In FIG. 7, the computer 3, which can be typically a micro-computer or a workstation, is connected to various peripherals, for example a digital camera 310 or any other image acquisition or storage device, such as a scanner, providing information (images, video) to the computer 3. These images can be stored in the storage means which the computer has, such as a hard disk 304.

The computer 3 also has a communication interface 308 connected to a communication network 309, for example the well-known Internet network, capable of transmitting digital information to the computer.

The computer 3 also has data storage means such as a hard disk 304, and a diskette drive 305 allowing writing of data on a diskette 305 and reading of these data. The computer may also have a compact disk (CDROM) drive (not depicted) on which there can be stored images, thus constituting a database, and a PC CARD reader (not depicted).

According to a preferred embodiment of the invention, the executable code of the program making it possible to implement the image indexing and/or search methods is stored on the hard disk 304.

According to a variant embodiment, the executable code of this program is stored in a read only memory (ROM) 300 of the computer.

According to a second variant embodiment, the executable code of the program can be downloaded from the communication network 309 via the communication interface 308 in order to be stored on the hard disk 304.

The computer 3 also has a screen 302 making it possible to view images and to be used as a graphical interface between the program and the user, the latter being able to formulate queries by means of, for example, a pointing device (not depicted) such as a mouse or light-pen, and a keyboard 303.

The computer has a central processing unit (CPU) 301, for example a microprocessor, which controls and directs the execution of the instructions of the program according to the invention stored in the read only memory 300 or on the hard disk 304. The central processing unit 301 then carries out the function of the control unit 80 described previously in relation to FIG. 1.

The computer also has a random access memory (RAM) 307 having registers intended to store the variables created and modified during execution of the program, notably the variables mentioned previously in relation to the description of FIGS. 2 and 6, as can be seen in the enlarged representation of the RAM in FIG. 7.

Finally, the computer has a communication bus 311 to allow communication and interoperability between the various aforementioned units making up the computer 3.

Of course, many modifications can be made to the embodiments of the invention described above without departing from the scope of the invention.

The invention claimed is:

1. A method of indexing a digital image comprising a plurality of blocks, comprising the following steps:
   generating a first information item characteristic of the visual content of the image;
   generating a second information item from the first information item, wherein the second information item is indicative of a degree of significance of the visual content of at least one of the plurality of blocks with respect to the overall content of the image and thereby characteristic of the spatial distribution of the visual content of the image in its image plane; and
   associating, with the image, an index composed of the first information item and the second information item,
   wherein said step of generating the first information item comprises the following substeps:
   dividing the image plane of the image according to a partitioning comprising the plurality of blocks, the plurality of blocks comprising a predefined number N of blocks;
   extracting, from each of the blocks, a data item of a first type representing at least one characteristic of the visual content of the block under consideration; and
   generating the first information item as being a vector having N components, each of which is one of the data items of the first type,
   wherein said step of generating the second information item comprises the following substeps:
   calculating, for each of the blocks, a data item of a second type indicative of a degree of significance of the visual content of the block under consideration with respect to the overall content of the image;
   generating the second information item as being a vector having N components, each of which is one of the data items of the second type, and
   wherein for each of the blocks, the data item of a second type, indicative of a degree of significance of the visual content of the block under consideration with respect to the overall content of the image, is obtained by applying the following formula:

$$w_i^{Im} = \frac{\|h_i^{Im}\|}{\sum_{i=1}^{N} \|h_i^{Im}\|}$$

according to which the data item of the second type ($w_i^{Im}$) is obtained by calculating the ratio between the Euclidean norm of the data item of the first type associated with the block under consideration and the sum of the Euclidean norms of the data items of the first type associated with all the blocks of the image.

2. An image indexing method according to claim 1, wherein the image plane of the image is divided according to a rectangular grid.

3. An image indexing method according to claim 2, wherein the predefined number N of blocks is equal to sixteen.

4. An image indexing method according to claim 1, wherein each of the data items of the first type, representing at least one characteristic of the visual content of a block under consideration of the image, represents the distribution of colours in the block.

5. A method of indexing a digital image comprising a plurality of blocks, comprising the following steps:

generating a first information item characteristic of the visual content of the image;

generating a second information item from the first information item, wherein the second information item is indicative of a degree of significance of the visual content of at least one of the plurality of blocks with respect to the overall content of the image and thereby characteristic of the spatial distribution of the visual content of the image in its image plane; and associating, with the image, an index composed of the first information item and the second information item, wherein said step of generating the first information item comprises the following substeps:

dividing the image plane of the image according to a partitioning comprising the plurality of blocks, the plurality of blocks comprising a predefined number N of blocks;

extracting, from each of the blocks, a data item of a first type representing at least one characteristic of the visual content of the block under consideration; and generating the first information item as being a vector having N components, each of which is one of the data items of the first type, wherein:

the image plane of the image is divided according to a quadtree decomposition process by means of which, at each phase of the decomposition, a block under consideration, referred to as the "parent block", is decomposed into four blocks, referred to as "child blocks", equal in size to a quarter the size of the parent block, and whose combination gives the parent block, the decomposition beginning with the overall image plane of the image and finishing when the predefined number N of blocks is reached;

at each phase of the decomposition, there is calculated, for each of the child blocks, a data item of a second type, indicative of a degree of significance of the visual content of the child block under consideration with respect to the overall visual content of the parent block;

the second information item is composed of the set of the data items of the second type stored according to a quadtree structure, each node of which is constituted by one of the data items of the second type;

at each phase of the quadtree decomposition of the image, there is extracted, from the parent block under consideration, a data item of the first type representing at least one characteristic of its visual content and, for each child block obtained by decomposition of the parent block , there is extracted a data item of the first type representing at least one characteristic of the visual content of the child block under consideration; and the data item of the second type indicative of a degree of significance of the visual content of a child block under consideration with respect to the overall visual content of the corresponding parent block is obtained by applying the following formula:

$$w_f^p = \frac{\|h_f^p\|}{\|h_p\|}$$

according to which the data item of the second type calculated for a child block under consideration is obtained by calculating the ratio between the Euclidean norm of the data item of the first type extracted for the said child block under consideration and the Euclidean norm of the data item of the first type extracted from the corresponding parent block.

6. A digital data processing device adapted to implement an image indexing method according to any one of claims 1 and 5.

7. A computer, comprising a digital data processing device according to claim 6.

8. A computer program stored on a computer-readable medium, the program comprising program instructions for causing a computer to perform an image indexing method according to any one of claims 1 and 5.

9. A method of searching for images, from an example image, in a database in which digital images are stored, wherein the example image and each of the images stored in the database are indexed according to an image indexing method, wherein said image indexing method comprises the following steps generating a first information item characteristic of the visual content of the image;

generating a second information item from the first information item, wherein the second information item is indicative of a degree of significance of the visual content of at least one of the plurality of blocks with respect to the overall content of the image and thereby characteristic of the spatial distribution of the visual content of the image in its image plane; and associating, with the image, an index composed of the first information item and the second information item, and wherein the image search method comprises the following steps calculating a first similarity between the example image and each of the images amongst a predefined plurality of stored images, the first similarity being calculated from the second information items associated respectively with the example image and the stored image under consideration;

providing a first subset of images selected from amongst the predefined plurality of images according to their degree of first similarity with the example image;

calculating a second similarity between the example image and each of the images amongst the first subset of selected images, the second similarity being calculated from the first information items associated respectively with the example image and the selected image under consideration; and providing at least one image referred to as a result image, the at least one result image being selected from amongst the first subset of selected images, according to its degree of second similarity with the example image, and wherein said step of calculating a first similarity between the example image and each of the images amongst a predefined plurality of stored images is implemented by an isomorphism detection method applied to quadtrees representing the second information items associated respectively with the example image and the stored image under consideration.

10. An image search method according to claim 9, wherein said step of calculating a second similarity between the example image and each of the images amongst the first subset of selected images is implemented by calculating a distance between the first information item associated with the example image and the first information item associated with the stored image under consideration.

11. An image search method according to claim 10, wherein said step of calculating the second similarity is implemented by calculating the sum of the distances between each of the components of the first information item associated with the example image and the corresponding component of the first information item associated with the stored image under consideration.

12. An image search method according to claim 11, wherein each of the components of the first information items associated with the example image and with the stored image under consideration is a colour histogram and the sum of the distances between these components is the sum of the intersections between these components.

13. An image search method according to claim 9, wherein:
  the image plane of the image is divided according to a quadtree decomposition process by means of which, at each phase of the decomposition, a block under consideration, referred to as the "parent block", is decomposed into four blocks, referred to as "child blocks", equal in size to a quarter the size of the parent block, and whose combination gives the parent block, the decomposition beginning with the overall image plane of the image and finishing when the predefined number N of blocks is reached;
  at each phase of the decomposition, there is calculated, for each of the child blocks, a data item of a second type, indicative of a degree of significance of the visual content of the child block under consideration with respect to the overall visual content of the parent block; and
  the second information item is composed of the set of the data items of the second type stored according to a quadtree structure, each node of which is constituted by one of the data items of the second type.

14. An image search method according to claim 13, wherein:
  at each phase of the quadtree decomposition of the image, there is extracted, from the parent block under consideration, a data item of the first type representing at least one characteristic of its visual content and, for each child block obtained by decomposition of the parent block, there is extracted a data item of the first type representing at least one characteristic of the visual content of the child block under consideration;
  the data item of the second type indicative of a degree of significance of the visual content of a child block under consideration with respect to the overall visual content of the corresponding parent block is obtained by applying the following formula:

$$w_i^p = \frac{\|h_f^p\|}{\|h_p\|}$$

according to which the data item of the second type calculated for a child block under consideration is obtained by calculating the ratio between the Euclidean norm of the data item of the first type extracted for the said child block under consideration and the Euclidean norm of the data item of the first type extracted from the corresponding parent block.

15. A digital data processing device, comprising means adapted to implement an image search method according to claim 9.

16. A computer, comprising a digital data processing device according to claim 15.

17. A computer program stored on a computer-readable medium, the program comprising program instructions for causing a computer to perform an image search method according to claim 9.

18. A method of searching for images, from an example image, in a database in which digital images are stored, wherein the example image and each of the images stored in the database are indexed according to an image indexing method,
  wherein said image indexing method comprises the following steps
  generating a first information item characteristic of the visual content of the image;
  generating a second information item from the first information item, wherein the second information item is indicative of a degree of significance of the visual content of at least one of the plurality of blocks with respect to the overall content of the image and thereby characteristic of the spatial distribution of the visual content of the image in its image plane; and
  associating, with the image, an index composed of the first information item and the second information item,
  and wherein the image search method comprises the following steps
  calculating a first similarity between the example image and each of the images amongst a predefined plurality of stored images, the first similarity being calculated from the second information items associated respectively with the example image and the stored image under consideration;
  providing a first subset of images selected from amongst the predefined plurality of images according to their degree of first similarity with the example image;
  calculating a second similarity between the example image and each of the images amongst the first subset of selected images, the second similarity being calculated from the first information items associated respectively with the example image and the selected image under consideration; and
  providing at least one image referred to as a result image, the at least one result image being selected from amongst the first subset of selected images, according to its degree of second similarity with the example image,
  and wherein said step of calculating a first similarity between the example image and each of the images amongst a predefined plurality of stored images is implemented by calculating a distance between the second information item associated with the example image and the second information item associated with the stored image under consideration,
  and wherein said step of generating the second information item comprises the following substeps
  calculating, for each of the blocks, a data item of a second type indicative of a degree of significance of the visual content of the block under consideration with respect to the overall content of the image; and
  generating the second information item as being a vector having N components, each of which is one of the data items of the second type,
  and wherein, for each of the blocks, the data item of a second type, indicative of a degree of significance of the visual content of the block under consideration with respect to the overall, content of the image, is obtained by applying the following formula:

$$w_i^{lm} = \frac{\|h_i^{lm}\|}{\sum_{i=1}^{N} \|h_i^{lm}\|}$$

according to which the data item of the second type is obtained by calculating the ratio between the Euclidean norm of the data item of the first type associated with the block under consideration and the sum of the Euclidean norms of the data items of the first type associated with all the blocks of the image.

* * * * *

UNITED STATES PATENT AND TRADEMARK OFFICE
CERTIFICATE OF CORRECTION

PATENT NO. : 7,103,237 B2
APPLICATION NO. : 09/835392
DATED : September 5, 2006
INVENTOR(S) : Lilian Labelle It is certified that error appears in the above-identified patent and that said Letters Patent is hereby corrected as shown below:

TITLE PAGE:
(56) References Cited OTHER PUBLICATIONS
Under Shih Fu Chang and John R. Smith.: "and" should read -- and --;
Under T. Chang and J. Kuo,: "Transfom"." should read -- Transform". --;
Under B. Moghaddam et at.,: "Access o" should read -- Access of --;
Under J.R. Smith and S.Chang, (first occurrence on page two): "Retrieva"I," should read -- Retrieval", --;
Under J.R. Smith and S. Chang, (second occurrence on page two): "Conferenc" should read -- Conference --;
Under J.R. Smith and S. Chang, (third occurrence on page two): "Auotmated" should read -- Automated --;
Under R. Milanese et al.,: "th" should read -- the --; and
"Information" should read -- International --;
Under A, Del Bimbo et al.,: "A, Del Bimbo" should read -- A. Del Bimbo --; and
"Worksho" should read -- Workshop --;
Under Yamomoto, H., et al.,: "*Distributions*"Proceedings" should read
-- *Distributions*", Proceedings --; and "Imag" should read -- Image --; and
Under Sm ith, J. R., et al.,: "Sm ith J. R.," should read -- Smith, J. R., --.

Insert the following:
-- (30) Foreign Application Priority Data
Apr. 17, 2000 (FR) 00 04923 --.

DRAWINGS:
Sheet 3, Figure 3, " $h_i^{I_m}$ " should read -- $h_i^{I_m}$ -- and "$B_l$" should read -- $B_i$ --.

COLUMN 9:
Line 28, "(S31 1)" should read -- (S311) --.

COLUMN 10:
Line 54, " $h_i^{IM}$ " should read -- $h_i^{I_m}$ --.

COLUMN 11:
Line 51 and 58, "h$^p$" should read -- h$_p$ --.

COLUMN 14:
Line 55, "starts" should read -- start --.

UNITED STATES PATENT AND TRADEMARK OFFICE
CERTIFICATE OF CORRECTION

PATENT NO. : 7,103,237 B2
APPLICATION NO. : 09/835392
DATED : September 5, 2006
INVENTOR(S) : Lilian Labelle It is certified that error appears in the above-identified patent and that said Letters Patent is hereby corrected as shown below:

COLUMN 17:
Line 49, "block ," should read -- block, --; and

Line 60, " $w_f^p = \frac{\|h_f^p\|}{\|h_p\|}$ " should read -- $w_i^p = \frac{\|h_f^p\|}{\|h_p\|}$ --.

COLUMN 18:
Line 18 and 31, "steps" should read -- steps: --.

COLUMN 19:
Line 41, "block ," should read -- block, --.

COLUMN 20:
Lines 11 and 26, "steps" should read -- steps: --; and
Line 56, "substeps" should read -- substeps: --.

COLUMN 21:
Line 1, "overall," should read -- overall --.

Signed and Sealed this

Seventeenth Day of July, 2007

JON W. DUDAS
*Director of the United States Patent and Trademark Office*